(12) United States Patent
Pincemin

(10) Patent No.: US 7,577,365 B2
(45) Date of Patent: Aug. 18, 2009

(54) OPTICAL PULSE REGENERATION DEVICE, INSTALLATION COMPRISING ONE SUCH DEVICE AND USE OF SAME

(75) Inventor: Erwan Pincemin, Gommenec'h (FR)

(73) Assignee: France Telecom, Paris (FR)

( * ) Notice: Subject to any disclaimer, the term of this patent is extended or adjusted under 35 U.S.C. 154(b) by 466 days.

(21) Appl. No.: 10/553,879

(22) PCT Filed: Apr. 20, 2004

(86) PCT No.: PCT/FR2004/000970

§ 371 (c)(1),
(2), (4) Date: Mar. 10, 2006

(87) PCT Pub. No.: WO2004/095735

PCT Pub. Date: Nov. 4, 2004

(65) Prior Publication Data

US 2006/0221425 A1   Oct. 5, 2006

(30) Foreign Application Priority Data

Apr. 22, 2003   (FR) .................................. 03 04928

(51) Int. Cl.
*H04B 10/12* (2006.01)
(52) U.S. Cl. .................... 398/147; 398/148; 398/149; 398/159; 398/175; 398/81; 385/122; 385/123; 359/326; 359/332

(58) Field of Classification Search .................. 398/173, 398/174, 175, 176, 177, 178, 179, 180, 181, 398/147, 142, 146, 148, 149, 154, 155, 158, 398/159, 160, 81, 80, 186, 188; 359/326–332; 385/1, 2, 4, 5, 15, 122, 123
See application file for complete search history.

(56) References Cited

U.S. PATENT DOCUMENTS 6,327,061 B1 * 12/2001 Desurvire ...................... 398/9
7,298,948 B2 * 11/2007 Pincemin .................... 385/122

OTHER PUBLICATIONS

Audouin O., et al; "Use of Fast In-line Saturable Absorbers in Wavelength-Division-Multiplexed Soliton Systems"; IEEE Photonics Technology Letters; vol. 10, No. 6, Jun. 1, 1998.
Dany B, et al.; "Assessment of 16 40 Gbit/s dispersion-managed transoceanic systems with high spectral efficiency"; Electronics Letters, IEE, Stevenage, GB; vol. 35, Nr.18, Sep. 1999.

* cited by examiner

*Primary Examiner*—Hanh Phan
(74) *Attorney, Agent, or Firm*—Robert L. Epstein; Epstein Drangel Bazerman & James, LLP

(57) ABSTRACT

This device for optically regenerating pulses includes a synchronous intensity modulator to provide time synchronization for pulses passing through it and to stabilize intensity fluctuations in the pulses. In addition, it includes noise suppression circuitry in the form of a saturable absorber that is distinct from the synchronous intensity modulator and the intensity fluctuations stabilizer.

4 Claims, 2 Drawing Sheets

Figure 1:
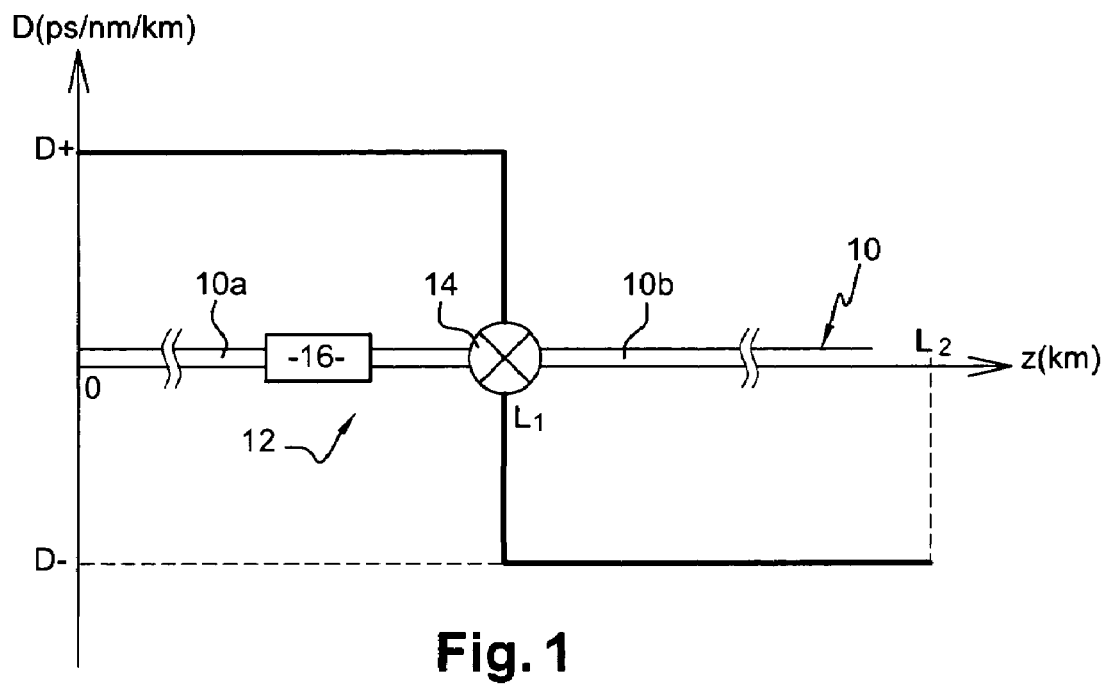

OPTICAL PULSE REGENERATION DEVICE, INSTALLATION COMPRISING ONE SUCH DEVICE AND USE OF SAME

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

1. Field of the Invention

The present invention relates to a device for optically regenerating pulses. The invention also relates to an optical transmission installation including such a device, and to the use of the device for regenerating dispersion-managed (DM) soliton pulses.

More precisely, the invention relates to a device for optically regenerating pulses, the device being of the type comprising time synchronization means and means for stabilizing the intensity fluctuations of the pulses.

2. Description of Prior Art Including Information Disclosed Under 37 CFR 1.97 and 1.98

Devices are known for optically regenerating pulses that are effective in particular for regenerating pulses of the soliton type. Those devices implement optical regeneration of the reamplification, reshaping, and retiming (3R) type.

Soliton type pulses have the property of propagating without deformation in a non-linear medium since these particular pulses constitute a solution to the non-linear Schrödinger equation. Nevertheless, the accumulation of amplified spontaneous emission noise disturbs the propagation of such pulses by generating intensity fluctuations and time jitter (known as Gordon-Haus jitter), whence the need to regenerate them optically.

In addition, for a soliton pulse to propagate without deformation and to benefit from ideal optical regeneration, the emitted pulses must not be too close together, which imposes narrow time widths for soliton pulses, and thus a broad spectrum. This leads to problems with ultra-dense wavelength division multiplexing (WDM) type optical transmission applications, in particular at data rates exceeding 40 gibabits per second (Gbit/s) and over long distances of the transoceanic type.

An advantageous solution for that type of application is to use DM type soliton pulses which provide significant advantages over conventional soliton pulses for high capacity transmission systems. However, a DM soliton is much less suitable than a conventional soliton for 3R regeneration.

For a DM type soliton pulse, a known device providing optical regeneration is described in particular in the document entitled "Stability of synchronous intensity modulation control of 40 Gbit/s dispersion-managed soliton transmissions" by Erwan Pincemin, Olivier Audouin, Bruno Dany, and Stefan Wabnitz, published in the Journal of Lightwave Technology, Vol. 19, No. 5, May 2001. The solution recommended in that document consists in using a synchronous intensity modulator disposed at a suitable location along the optical fiber for transmitting DM soliton pulses. However, in order to be efficient, that device must also suppress noise, and in particular amplified spontaneous emission noise. To do that, the synchronous intensity modulator must have an extinction ratio that is sufficient, e.g. 10 decibels (dB), which makes it necessary to use short DM solitons that present a broad spectrum. The synchronous intensity modulator must not have a negative impact on the time width of the DM soliton pulse.

The invention seeks to remedy the above-mentioned drawbacks by providing a device for optically regenerating pulses, in particular DM soliton pulses, with said device being capable of optically regenerating such pulses while enabling them to be used for ultra-dense WDM type transmissions at a very high data rate.

BRIEF SUMMARY OF THE INVENTION

To this end, the invention provides a device for optically regenerating pulses, the device comprising time synchronization means and intensity fluctuation stabilization means for the pulses, and being characterized in that it further comprises noise suppression means that are distinct from the synchronization means and the stabilization means.

Thus, since the noise suppression means are distinct from the synchronization means and the stabilization means, there is no need to use the synchronization means and the stabilization means for eliminating noise such as amplified spontaneous emission noise. Specifically, under such circumstances, synchronous modulation of small intensity suffices for synchronizing the signal and stabilizing intensity fluctuations, with noise being eliminated separately.

A regenerator device of the type of the invention may also include one or more of the following characteristics:

the time synchronization means and the intensity fluctuation stabilization means comprise a synchronous intensity modulator; and the noise suppression means comprise a saturable absorber for suppressing amplified spontaneous emission noise.

The invention also provides an installation for optically transmitting pulses, the installation including means for propagating light signals, the installation being characterized in that it includes an optical regenerator device inserted in the propagation means.

Such an optical transmission installation of the invention may also include one or more of the following characteristics:

the propagation means comprise first propagation means having abnormal dispersion and second propagation means having normal dispersion, the time synchronization means and the intensity fluctuation stabilization means being inserted in the vicinity of the junction between the first and second propagation means; and the noise suppression means are situated upstream from the synchronization means and the stabilization means in the pulse propagation direction.

Finally, the invention also provides the use of a device as described above for regenerating DM soliton pulses.

BRIEF DESCRIPTION OF THE SEVERAL VIEWS OF DRAWINGS

Figure 2:
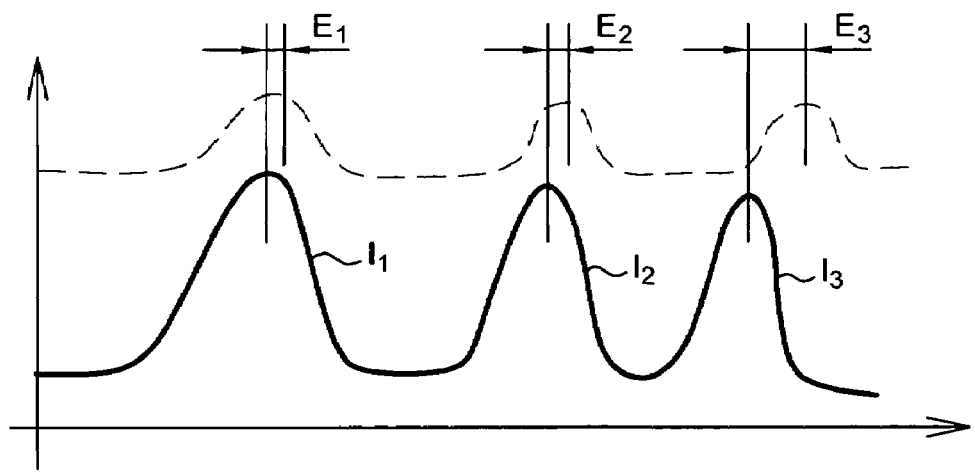
Figure 3:
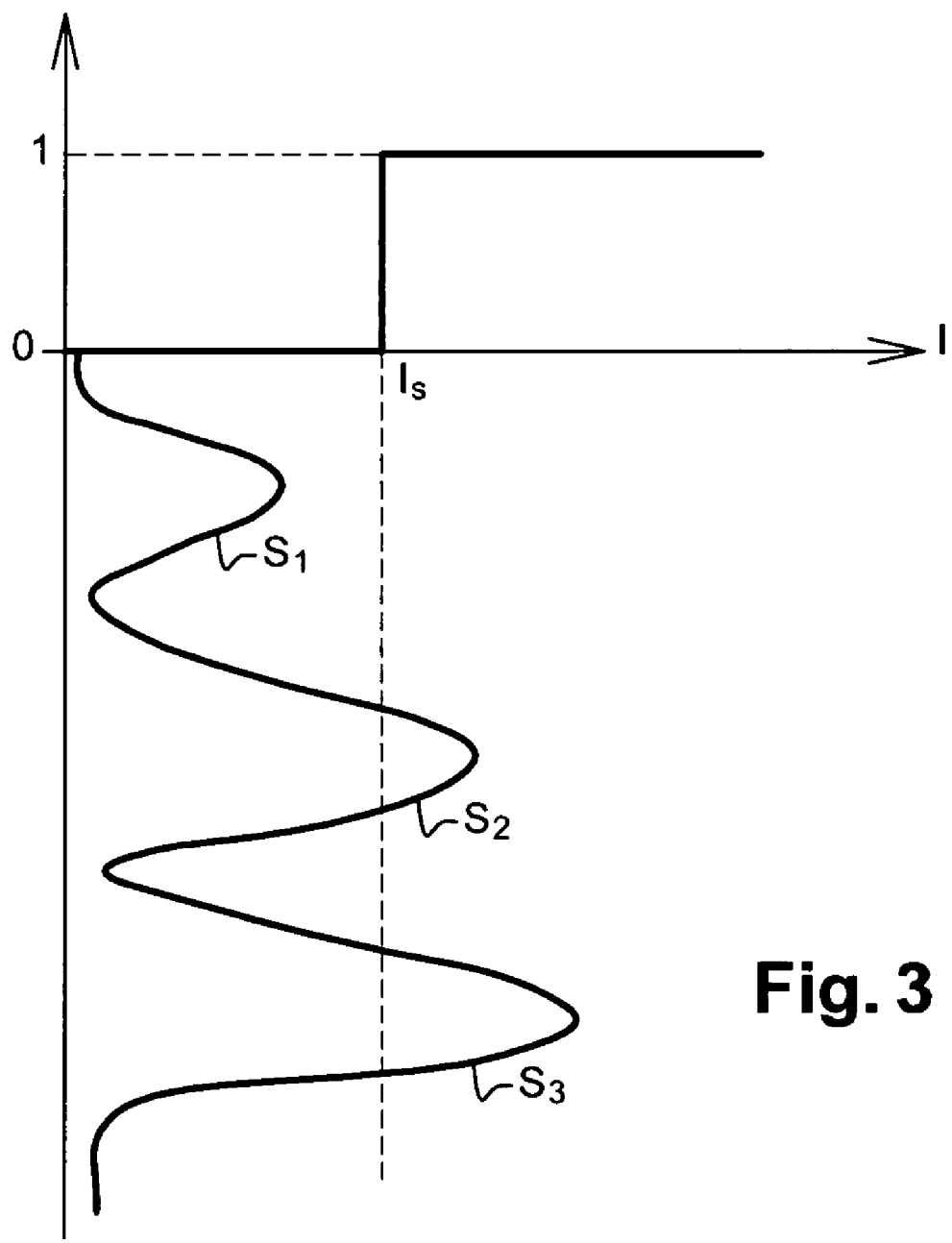

To these and to such other objects that may hereinafter appears, the present invention relates to a device for optically regenerating pulses, an installation including such a device, and the use of the device, as described in detail in the following specification and recited in the annexed claims, taken together with the accompanying drawings, in which like numerals refer to like parts and in which:

FIG. 1 is a diagram of the general structure of an installation for optically transmitting pulses and that includes a device of the invention; and FIGS. 2 and 3 are diagrams illustrating the effect of an optical regenerator device of the invention on light pulses propagating in the installation of FIG. 1.

DETAILED DESCRIPTION OF THE INVENTION

The optical transmission installation shown in FIG. 1 comprises a line fiber 10 for optically transmitting DM type soliton pulses. These pulses are used for very high rate optical transmission applications, e.g. transmissions at 40 Gbit/s or more.

The line fiber 10 comprises a first fiber portion 10a having abnormal dispersion, with a dispersion coefficient $D_+$ that is equal to 2 picoseconds per nanometer per kilometer (ps/nm/km) for example. This first fiber portion 10a having abnormal dispersion is extended by a second fiber portion 10b having normal dispersion, with a dispersion coefficient D that is equal to −2 ps/nm/km. By way of example, the first fiber portion 10a has a length $L_1$=20.5 km for a total line fiber length equal to $L_2$=40 km.

The scheme shown in FIG. 1 can be repeated periodically, so as to provide a line fiber of considerably greater length, in particular so as to obtain line fibers that can be used for transoceanic transmissions.

At the junction between the first and second fiber portions 10a and 10b, there is installed a synchronous intensity modulator 14 of conventional type, serving to provide time synchronization for pulses passing through it and to stabilize intensity fluctuations in said pulses. More precisely, the synchronous intensity modulator 14 has an effect on pulses propagating in the line fiber 10 as described below with reference to FIG. 2.

The optical regenerator device 12 further comprises noise suppression means 16 that are distinct from the synchronous intensity modulator 14 and that serve to suppress amplified spontaneous emission noise. These noise suppression means are implemented by a saturable absorber 16. More precisely, the effect of this saturable absorber 16 is described below with reference to FIG. 3.

In a preferred embodiment, the saturable absorber 16 is disposed upstream from the synchronous intensity modulator 14 in the line fiber 10 relative to the propagation direction of the DM soliton pulses. Although, ideally, the saturable absorber 16 can be placed either upstream or downstream from the synchronous intensity modulator 14, in fact, when the response of the absorber is not perfect, it is more advantageous to place the saturable absorber upstream from the synchronous intensity modulator so that the modulator can correct the imperfections in the response of the saturable absorber.

As shown in FIG. 2, the synchronous intensity modulator 14 modulates the pulses $I_1$, $I_2$, and $I_3$ to a small extent by using synchronized modulating signals that serve to correct the respective synchronization errors $E_1$, $E_2$, and $E_3$ of said pulses, but without attempting to eliminate noise.

Finally, as shown in FIG. 3, the saturable absorber eliminates signals such as a signal $S_1$ having maximum intensity below an intensity threshold $I_S$, while passing signals $S_2$ and $S_3$ having maximum intensity exceeding the threshold intensity $I_S$. It also readjusts the signals $S_2$ and $S_3$. The threshold intensity $I_S$ is selected in such a manner that the signals that are eliminated, such as the signal $S_1$, are signals that come from amplified spontaneous emission noise.

It can clearly be seen that a regenerator device of the invention enables DM soliton pulses to be properly regenerated in very high data rate optical transmission installations, in particular installations of the ultra-dense WDM type.

The invention claimed is:

1. A device (12) for optically regenerating dispersion-managed (DM) soliton pulses for use in optical propagation means comprising first propagation means (10a) having abnormal dispersion and second propagation means (10b) having normal dispersion, said device comprising a synchronous intensity modulator (14) serving, when placed in the vicinity of the junction between the first and second propagation means (10a, 10b), to perform time synchronization on DM soliton pulses passing through it and intensity fluctuation stabilization on said pulses, the device being characterized by the fact that it comprises noise suppression means (16) for suppressing amplified spontaneous emission noise and that are distinct from the synchronous intensity modulator (14).

2. A device according to claim 1, in which the noise suppression means (16) comprise a saturable absorber.

3. A device according to claim 1, in which the noise suppression means are disposed upstream from the synchronous intensity modulator (14) in the propagation direction of the DM soliton pulses when the device is inserted in the propagation means.

4. An installation for optically transmitting DM soliton pulses, the installation comprising:
propagation means (10) comprising first propagation means (10a) having abnormal dispersion and second propagation means (10b) having normal dispersion; and
a device for optically regenerating DM soliton pulses in accordance with claim 1; the synchronous intensity modulator (14) of the regenerator device (12) being installed in the vicinity of the junction between the first and second propagation means.

* * * * *